United States Patent
Zatopek et al.

(10) Patent No.: US 9,987,665 B2
(45) Date of Patent: Jun. 5, 2018

(54) SEPARATION OF MACHINABLE PARCELS FROM NON-MACHINABLE PARCEL STREAM

(71) Applicant: Siemens Industry, Inc., Alpharetta, GA (US)

(72) Inventors: John M. Zatopek, Arlington, TX (US); Abdul Hamid Salemizadeh, Burleson, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 144 days.

(21) Appl. No.: 15/212,966

(22) Filed: Jul. 18, 2016

(65) Prior Publication Data
US 2018/0015506 A1   Jan. 18, 2018

(51) Int. Cl.
 *B07C 3/08* (2006.01)
 *B07C 3/14* (2006.01)
 *B07C 3/20* (2006.01)
 *B65G 59/00* (2006.01)

(52) U.S. Cl.
 CPC .................. *B07C 3/08* (2013.01); *B07C 3/14* (2013.01); *B07C 3/20* (2013.01); *B65G 59/00* (2013.01)

(58) Field of Classification Search
 USPC ........................................................ 700/224
 See application file for complete search history.

(56) References Cited

U.S. PATENT DOCUMENTS

| | | | |
|---|---|---|---|
| 8,086,344 B1 * | 12/2011 | Mishra | G06Q 30/0283 700/214 |
| 8,283,588 B2 | 10/2012 | Norris | |
| 9,171,406 B2 | 10/2015 | Carpenter | |
| 2001/0034608 A1 * | 10/2001 | Gendreau | G06Q 10/08 705/334 |
| 2004/0004119 A1 * | 1/2004 | Baldassari | B07C 3/10 235/384 |
| 2005/0056573 A1 | 3/2005 | Berdelle-Hilge | |
| 2006/0043188 A1 * | 3/2006 | Kricorissian | B07C 3/14 235/462.08 |

(Continued)

FOREIGN PATENT DOCUMENTS

| | | |
|---|---|---|
| DE | 1054380 B | 4/1959 |
| WO | 0242012 A1 | 5/2002 |
| WO | 2015009660 A1 | 1/2015 |

OTHER PUBLICATIONS

PCT International Search Report and Written Opinion of International Searching Authority dated Sep. 20, 2017 corresponding to PCT International Application No. PCT/US2017/037823 filed Jun. 16, 2017.

*Primary Examiner* — Kyle O Logan

(57) ABSTRACT

A parcel processing system and method. A method includes inducting a plurality of parcels in a non-machinable parcel stream by a non-machinable parcel processing system. The method includes recording physical characteristics of each of the parcels. The method includes comparing the recorded physical characteristics of each parcel to machinable requirements. The method includes identifying machinable parcels based on the comparison. The method includes sorting the identified machinable parcels to an automation discharge. The method includes transporting all non-machinable parcels to workstations, by the non-machinable parcel processing system, for manual processing.

20 Claims, 3 Drawing Sheets

(56) References Cited

U.S. PATENT DOCUMENTS

| | | | | |
|---|---|---|---|---|
| 2010/0082151 A1* | 4/2010 | Young | ............ | G06Q 10/08 |
| | | | | 700/226 |
| 2010/0082152 A1* | 4/2010 | Mishra | ............ | G06Q 10/08 |
| | | | | 700/226 |
| 2012/0187191 A1* | 7/2012 | Olmstead | ............ | G07G 1/0045 |
| | | | | 235/462.13 |
| 2014/0021258 A1* | 1/2014 | Olmstead | ............ | G06K 7/10544 |
| | | | | 235/462.41 |
| 2015/0347801 A1* | 12/2015 | Svetal | ............ | G06K 7/1447 |
| | | | | 235/454 |

* cited by examiner

SEPARATION OF MACHINABLE PARCELS FROM NON-MACHINABLE PARCEL STREAM

TECHNICAL FIELD

The present disclosure is directed, in general, to parcel processing techniques.

BACKGROUND OF THE DISCLOSURE

Non-machinable parcels, by definition, require processing to be performed manually to at least some degree. Non-machinable parcels are often delivered into the parcel stream in batches that also include machinable parcels. Manual processing of the machinable parcels is inefficient and expensive.

SUMMARY OF THE DISCLOSURE

Various disclosed embodiments include a parcel processing system and method. In one embodiment, a non-machinable parcel processing system includes a transport system configured to transport parcels received at a parcel induction. The non-machinable parcel processing system includes at least one measurement device configured to record physical characteristics of each of the transported parcels. The non-machinable parcel processing system includes an automation discharge for receiving machinable parcels. The non-machinable parcel processing system includes a plurality of workstations for manual processing of non-machinable parcels. The non-machinable parcel processing system includes a control system configured to identify each transported parcel as machinable or non-machinable based on the physical characteristics, and to control the transport system to move the machinable parcels to the automation discharge and the non-machinable parcels to respective workstations.

In various embodiments, the at least one measurement device includes a scale that weighs or estimates a weight of each parcel, and the physical characteristics of each parcel includes the weight of each parcel. The non-machinable parcel processing system of claim 1, wherein the at least one measurement device includes a scan tunnel and dimensioner that measures physical dimensions of each parcel, and the physical characteristics of each parcel includes the physical dimensions of each parcel. In various embodiments, the at least one measurement device includes a scan tunnel and dimensioner that produces an image of at least one side of each parcel, and the physical characteristics of each parcel includes a destination address, postage, or other indicia on each parcel. In various embodiments, the automation discharge transports the machinable parcels to an automation parcel processing system. In various embodiments, the control system performs a first-pass sort when transporting the non-machinable parcels to the respective workstations. In various embodiments, the parcel induction receives the parcels from a high-volume unloading and conveyor system. In various embodiments, the non-machinable parcel processing system further comprises an orientation device. In various embodiments, the non-machinable parcel processing system further comprises a destacking device. In various embodiments, the non-machinable parcel processing system further comprises a singulator.

In another embodiment, a method includes inducting a plurality of parcels in a non-machinable parcel stream by a non-machinable parcel processing system. The method includes recording physical characteristics of each of the parcels. The method includes comparing the recorded physical characteristics of each parcel to machinable requirements. The method includes identifying machinable parcels based on the comparison. The method includes sorting the identified machinable parcels to an automation discharge. The method includes transporting all non-machinable parcels to workstations, by the non-machinable parcel processing system, for manual processing.

In various embodiments, recording the physical characteristics of each parcel includes weighing or estimating a weight of each parcel. In various embodiments, recording the physical characteristics of each parcel includes measuring physical dimensions of each parcel. In various embodiments, recording the physical characteristics of each parcel includes producing an image of at least one side of each parcel, and the physical characteristics of each parcel includes a destination address, postage, or other indicia on each parcel. In various embodiments, the automation discharge transports the machinable parcels to an automation parcel processing system. In various embodiments, the method further includes performing a first-pass sort when transporting the non-machinable parcels to the workstations. In various embodiments, inducting a plurality of parcels includes receiving the parcels from a high-volume unloading and conveyor system. In various embodiments, the method further includes orienting the parcels by the non-machinable parcel processing system. In various embodiments, the method further includes destacking the parcels by the non-machinable parcel processing system. In various embodiments, the method further includes singulating the parcels by the non-machinable parcel processing system.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
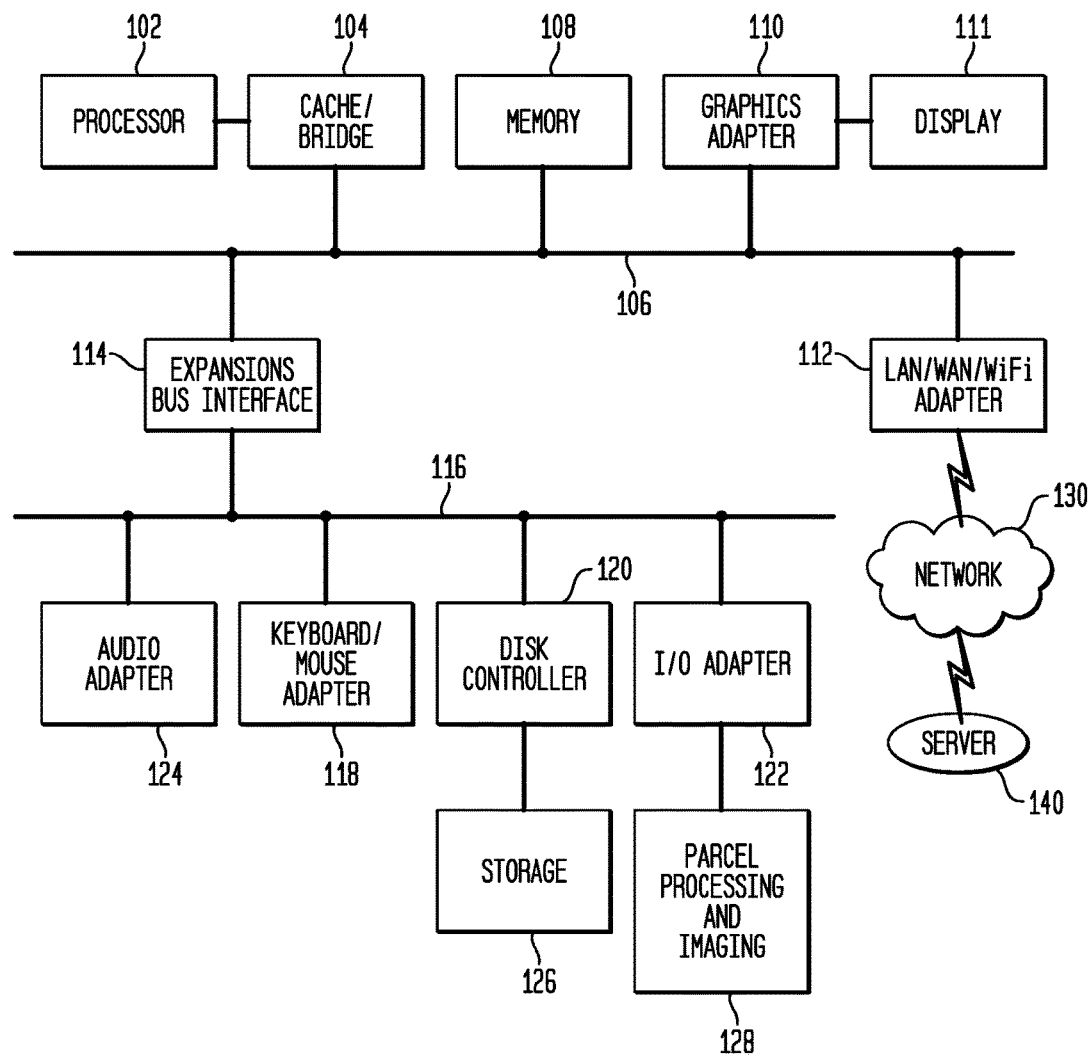
FIG. 1 depicts a block diagram of a data processing system in which an embodiment can be implemented.
Figure 2:
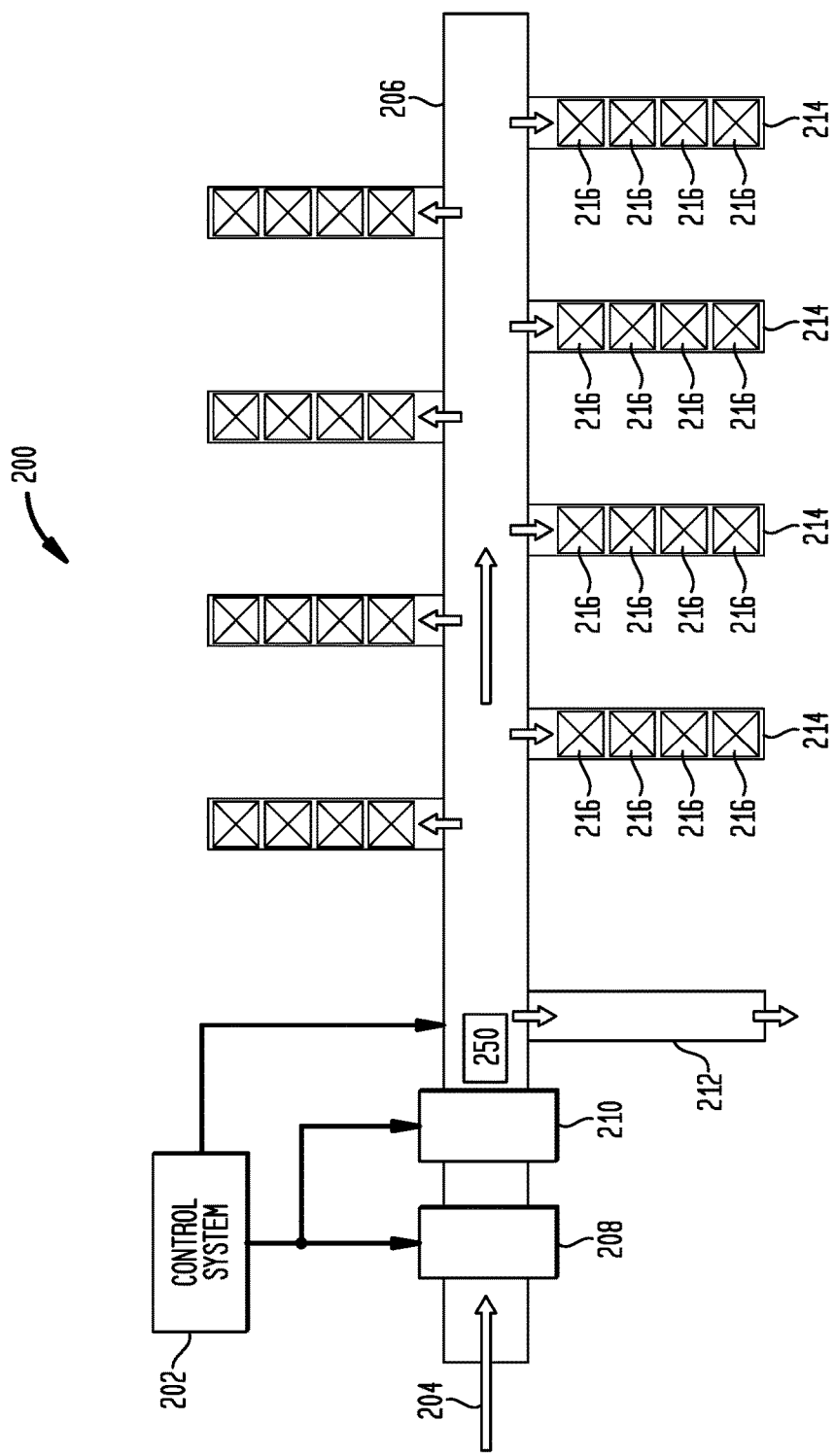
FIG. 2 depicts a schematic view of a parcel processing system according to disclosed embodiments.
Figure 3:
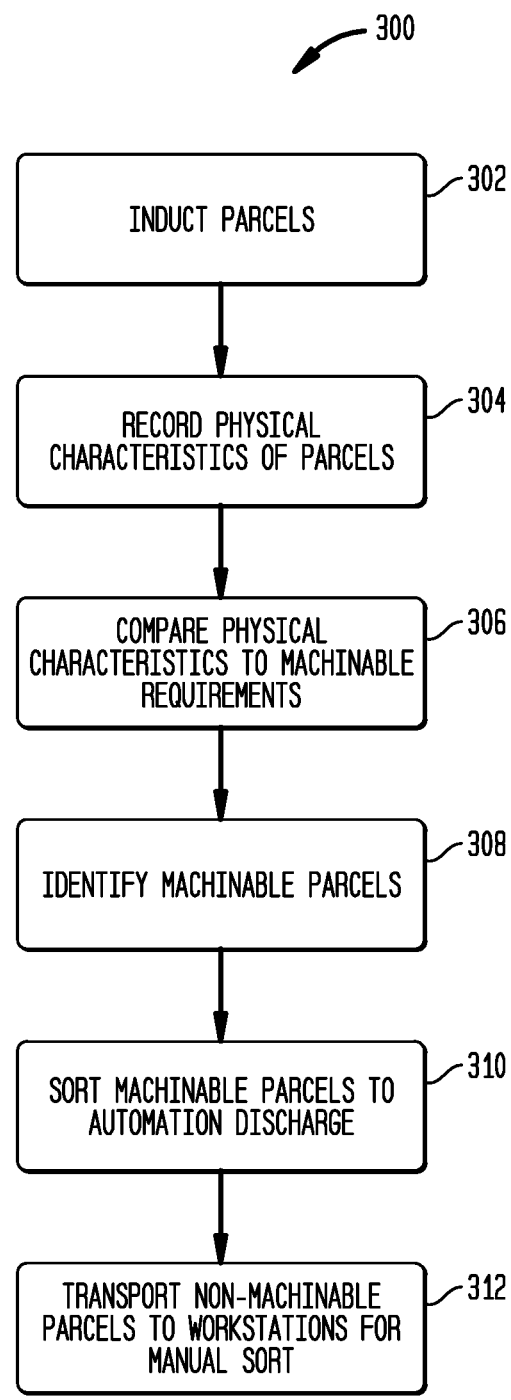
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In United States Postal Service (USPS) mail processing and distribution centers parcels or packages with dimensions that are larger or weigh more than acceptable by automation equipment are classified as Non-Machinable Outside (NMO). As used herein, "machinable" parcels refers to parcels that can be automatically scanned, sorted, and otherwise processed by automation equipment, and "non-machinable" parcels refers to those parcels that must be processed manually for at least some of the processing. As used herein, the term "parcel" refers to a package, sack, bag, box, barrel, bottle, pallet, luggage, or other item, generally excluding envelopes and "flats" such as magazines.

The current USPS NMO processing due to NMO processing being semi-manual, is operationally much more costly and time consuming for the USPS, compared to machinable parcel processing. The NMO parcel mail frequently arrives at the facility mixed with acceptable machinable parcel mail (within the size and weight range suitable for automation equipment). During the semi-automated sorting process for the NMO parcel mail, the machinable parcel mail remains comingled in the sort destination containers which will then be transported to another processing and distribution center in the USPS network or to a USPS delivery unit. These otherwise-machinable parcels continue to be processed manually due to being comingled with the NMO parcel mail and continue to require unnecessary costly manual processing until finally arriving at the destination delivery unit.

Disclosed embodiments include systems and methods for separation of machinable parcels from the non-machinable parcel stream. While the exemplary techniques described herein are described in terms of USPS processing, they apply as well to other public and private parcel processing systems. Similarly, where reference is made to NMO parcels or processes, this is intended to refer to any non-machinable parcels and processes for handling those processes, whether performed by USPS or other entities.

FIG. 1 depicts a block diagram of a data processing system 100 in which an embodiment can be implemented, for example as a control system for a mechanism as described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to parcel processing and imaging devices 128, as described herein, to image, scan, transport, weigh, label, address process, sort, and otherwise process the parcels in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein, and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing facility.

An induction system for use on the latest semi-automated sorters for NMO parcels is equipped with in-line weigh-in-motion scales and automatic dimensioning devices. By making the weight and dimension data available to the sort controller system, machinable parcel mail pieces could be identified and separated from the NMO parcel mail at the very initial stage of parcel processing by being assigned to a dedicated discharge or sorter outlet by the sort controller system for machinable items rather than being assigned to the discharge corresponding to their destination address code. The machinable mail items collected at the dedicated discharge can then be routed within the facility to the infeed system of the appropriate machinable parcel sortation system, thereby avoiding any and all further operational cost and time of manual handling in subsequent downstream processing operations.

FIG. 2 depicts a schematic view of a parcel processing system 200 according to disclosed embodiments. Each of the automated components described herein can be controlled by a data processing system 100, dedicated controllers, or other hardware as described herein, such as generally depicted as control system 202.

Parcels, such as parcel 250, are inducted to the parcel processing system at induction 204 as indicated by the arrow and are transported along transport 206. Transport 206 can be implemented, for example as one or more conveyor units. As described herein, in a typical implementation, parcel processing system 200 is intended and configured to processes non-machinable parcels, but some machinable parcels may also be inducted at induction 204. Induction 204 can be configured to receive parcels from any appropriate source, including a high-volume unloading and conveyor system.

As the parcel 250 is transported by transport 206, it passes by or through one or more measurement devices that measure or estimate, and record, the physical characteristics of the parcel 250. In this example, the parcel is measured by a scan tunnel and dimensioner 208 and a scale 210. The scan tunnel and dimensioner images one or more sides of the parcel 250 and measures or estimates the physical dimensions of the parcel 250. Scale 210 weighs or estimates the weight of parcel 250. While scan tunnel and dimensioner 208 and a scale 210 are examples of parcel processing devices that can be used in parcel processing system 200, those of skill in the art will recognize that other devices can also or alternatively be used, such as an orientation device that orients or "faces" each parcel to aid in further processing, a de-stacking device that de-stacks any stacked parcels, a singulator that ensures that the parcels 250 are transported one-at-a-time, an unwrapper device that removes any film or wrapping on the parcel, a destrapping device that removes any straps from the parcel, or other device. Each of such devices, including scan tunnel and dimensioner 208 and scale 210, can be implemented as individual processing devices or combined into multi-function processing devices, and each can be connected to communicate with and be controlled by control system 202.

Based on the determined physical characteristics of parcel 250, control system 202 can determine if parcel 250 is machinable or non-machinable, as described in more detail below. If parcel 250 is determined to be machinable, it is diverted to automation discharge 212. Automation discharge 212 can include a bin or wheeled container for transporting the machinable parcels 250 to automation equipment, or can include a separate transport system that automatically transports machinable parcels 250 to automation equipment for automatic processing.

Most parcels, however, will be confirmed to be non-machinable. These packages are transported along 206 to a plurality of runouts 214, each or which can include one or more manned workstations 216. At each manned workstation 216, an operator can manually process each non-machinable parcel 250 as necessary.

In a typical implementation in accordance with disclosed embodiments, the scan tunnel and dimensioner 208 images the parcel and the control system 202 determines destination address data for that parcel based on one or more images of the parcel. Once the parcel 250 is determined to be non-machinable, the control system sorts the parcel by directing it to a runout 214 corresponding to the destination address. For example, each runout can be assigned a particular geographic area as designated by a portion of a ZIP code in the destination address. At each runout 214, an operator at a manned workstation 216 can then manually place each parcel 250 into an appropriate output bin or container based on the destination address, for a second level of manual sorting. That is, a first-pass sort can be effectively performed by directing the non-machinable parcel to an appropriate runout 214, and the second-pass sort is manually performed by the operator by depositing the parcel in an appropriate bin or container. By moving machinable parcels to automation equipment, this inefficient and expensive manual process can be avoided for machinable parcels that are found in the non-machinable parcel stream, resulting in an improved parcel processing system.

FIG. 3 illustrates a process in accordance with disclosed embodiments that can be performed, for example, by a parcel processing system 200 as disclosed herein, referred to generically as the "system" below.

The system inducts a plurality of parcels in a non-machinable parcel stream (302). The plurality of parcels includes non-machinable parcels and machinable parcels.

The system records physical characteristics of each of the parcels (304). Recording the physical characteristics can include imaging one or more sides of the parcel to produce parcel images, and can include analyzing these images, such as to determine destination addresses, postage paid, barcodes or other indicia, etc. Recording the physical characteristics can include measuring the physical dimensions of the parcel, such as by determining the dimensions from the parcel images, using light sensors, using brush switches or other physical sensors, or using other sensors. Recording the physical characteristics can include measuring or estimating the weight of the parcel.

The system compares the recorded physical characteristics of each parcel to machinable requirements (306). This comparison can include determining if any analyses from the images are valid, such as if the destination address, postage paid, or barcodes or other indicia are valid. This comparison can include comparing the physical dimensions of each parcel with the maximum dimensions, in all or any direction, for a machinable parcel. This comparison can include comparing the measured or estimated weight of each parcel with the maximum weight for a machinable parcel.

The system identifies machinable parcels based on the comparison (308). For example, the system can identify a parcel as machinable if it has a valid destination, postage, or indicia, has dimensions that are equal to or less than the maximum dimensions for a machinable parcel, or does not weigh more than the maximum weight for a machinable parcel.

The system sorts the identified machinable parcels to an automation discharge (310). The automation discharge can include a bin or other container for collecting machinable parcels to be moved to automation equipment for automatic processing, or can include an automatic transport or conveyor to automatically move the machinable parcels to automation equipment for automatic processing.

The system transports all non-machinable parcels (all parcels not identified as machinable) to workstations for manual processing (312). The system can perform a first-pass sort in the process of moving each non-machinable parcel to a respective workstation.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A non-machinable parcel processing system, comprising:
    a transport system configured to transport parcels received at a parcel induction;
    at least one measurement device configured to record physical characteristics of each of the transported parcels;
    an automation discharge for receiving machinable parcels;
    a plurality of workstations for manual processing of non-machinable parcels; and
    a control system configured to identify each transported parcel as machinable or non-machinable based on the physical characteristics, and to control the transport system to move the machinable parcels to the automation discharge and the non-machinable parcels to respective workstations.

2. The non-machinable parcel processing system of claim 1, wherein the at least one measurement device includes a scale that weighs or estimates a weight of each parcel, and the physical characteristics of each parcel includes the weight of each parcel.

3. The non-machinable parcel processing system of claim 1, wherein the at least one measurement device includes a scan tunnel and dimensioner that measures physical dimensions of each parcel, and the physical characteristics of each parcel includes the physical dimensions of each parcel.

4. The non-machinable parcel processing system of claim 1, wherein the at least one measurement device includes a scan tunnel and dimensioner that produces an image of at least one side of each parcel, and the physical characteristics of each parcel includes a destination address, postage, or other indicia on each parcel.

5. The non-machinable parcel processing system of claim 1, wherein the automation discharge transports the machinable parcels to an automation parcel processing system.

6. The non-machinable parcel processing system of claim 1, wherein the control system performs a first-pass sort when transporting the non-machinable parcels to the respective workstations.

7. The non-machinable parcel processing system of claim 1, wherein the parcel induction receives the parcels from a high-volume unloading and conveyor system.

8. The non-machinable parcel processing system of claim 1, wherein the non-machinable parcel processing system further comprises an orientation device.

9. The non-machinable parcel processing system of claim 1, wherein the non-machinable parcel processing system further comprises a destacking device.

10. The non-machinable parcel processing system of claim 1, wherein the non-machinable parcel processing system further comprises a singulator.

11. A method for processing parcels, comprising:
    inducting a plurality of parcels in a non-machinable parcel stream by a non-machinable parcel processing system;
    recording physical characteristics of each of the parcels by the non-machinable parcel processing system;
    comparing the recorded physical characteristics of each parcel to machinable requirements by the non-machinable parcel processing system;
    identifying machinable parcels based on the comparison by the non-machinable parcel processing system;
    sorting the identified machinable parcels to an automation discharge by the non-machinable parcel processing system; and transporting all non-machinable parcels to workstations, by the non-machinable parcel processing system, for manual processing.

12. The method of claim 11, wherein recording the physical characteristics of each parcel includes weighing or estimating a weight of each parcel.

13. The method of claim 11, wherein recording the physical characteristics of each parcel includes measuring physical dimensions of each parcel.

14. The method of claim 11, wherein recording the physical characteristics of each parcel includes producing an image of at least one side of each parcel, and the physical characteristics of each parcel includes a destination address, postage, or other indicia on each parcel.

15. The method of claim 11, wherein the automation discharge transports the machinable parcels to an automation parcel processing system.

16. The method of claim 11, further comprising performing a first-pass sort when transporting the non-machinable parcels to the workstations.

17. The method of claim 11, wherein inducting a plurality of parcels includes receiving the parcels from a high-volume unloading and conveyor system.

18. The method of claim 11, further comprising orienting the parcels by the non-machinable parcel processing system.

19. The method of claim 11, further comprising destacking the parcels by the non-machinable parcel processing system.

20. The method of claim 11, further comprising singulating the parcels by the non-machinable parcel processing system.

* * * * *